United States Patent
Wu et al.

(10) Patent No.: US 11,669,680 B2
(45) Date of Patent: Jun. 6, 2023

(54) AUTOMATED GRAPH BASED INFORMATION EXTRACTION

(71) Applicant: International Business Machines Corporation, Armonk, NY (US)

(72) Inventors: Lingfei Wu, Elmsford, NY (US); Tengfei Ma, White Plains, NY (US); Tian Gao, Berkeley Heights, NJ (US); Xiaojie Guo, Burke, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

(21) Appl. No.: 17/165,440

(22) Filed: Feb. 2, 2021

(65) Prior Publication Data

US 2022/0245337 A1 Aug. 4, 2022

(51) Int. Cl.
*G06F 40/205* (2020.01)
*G06F 16/28* (2019.01)
(Continued)

(52) U.S. Cl.
CPC .......... *G06F 40/205* (2020.01); *G06F 16/288* (2019.01); *G06F 40/279* (2020.01);
(Continued)

(58) Field of Classification Search
CPC .... G06F 40/205; G06F 40/279; G06F 16/288; G06N 3/044; G06N 3/045; G06N 3/08; G06N 3/088; G06N 5/022
See application file for complete search history.

(56) References Cited

U.S. PATENT DOCUMENTS

| 7,809,548 B2 | 10/2010 | Mihalcea et al. |
| 10,255,269 B2 | 4/2019 | Quirk et al. |

(Continued)

FOREIGN PATENT DOCUMENTS

| CN | 110232186 A | 9/2019 |
| CN | 110598000 A | 12/2019 |

(Continued)

OTHER PUBLICATIONS

Babić K, Martinčić-Ipšić S, Meštrović A. Survey of Neural Text Representation Models. Information. 2020; 11(11):511. https://doi.org/10.3390/info/1110511 (Year: 2020).*

(Continued)

*Primary Examiner* — Daniel C Washburn
*Assistant Examiner* — Athar N Pasha
(74) *Attorney, Agent, or Firm* — Garg Law Firm, PLLC; Rakesh Garg; Peter Edwards

(57) ABSTRACT

A set of sentences within a natural language text document are parsed, generating a word-level graph corresponding to a sentence in the set of sentences. Within the word-level graph using a trained entity identification model, a set of entity candidates are identified. From a set of graphs modelling relationships between portions of the set of sentences, a set of embeddings is generated. From a set of pairs of embeddings in the set of embeddings using a set of deconvolution layers, a set of links between entity candidates within the set of entity candidates is extracted. From the set of links and the set of entity candidates, an output graph modelling linkages between portions of the set of sentences within the natural language text document is generated.

20 Claims, 10 Drawing Sheets

(51) Int. Cl.
*G06F 40/279* (2020.01)
*G06N 3/08* (2023.01)
*G06N 3/044* (2023.01)
*G06N 3/045* (2023.01)

(52) U.S. Cl.
CPC .............. *G06N 3/044* (2023.01); *G06N 3/045* (2023.01); *G06N 3/08* (2013.01)

(56) References Cited

U.S. PATENT DOCUMENTS

| | | |
|---|---|---|
| 2018/0341839 A1 | 11/2018 | Malak et al. |
| 2020/0104366 A1 | 4/2020 | Xu et al. |
| 2020/0250139 A1* | 8/2020 | Muffat .................. G06V 30/412 |

FOREIGN PATENT DOCUMENTS

| | | |
|---|---|---|
| CN | 106874378 B | 6/2020 |
| CN | 111382333 A | 7/2020 |

OTHER PUBLICATIONS

Nadeau et al., A survey of named entity recognition and classification, 2007, Lingvisticae Investigationes, 30(1), 3-26.

Chan et al., Exploiting syntactico-semantic structures for relation extraction, Proceedings of the 49th Annual Meeting of the Association for Computational Linguistics: Human Language Technologies, pp. 551-560, Jun. 19-24, 2011.

Miwa et al., End-to-End Relation Extraction using LSTMs on Sequences and Tree Structures, Proceedings of the 54th Annual Meeting of the Association for Computational Linguistics, vol. 1: Long Papers, pp. 1105-1116, Jun. 8, 2016.

Zhang et al., End-to-end neural relation extraction with global optimization, Proceedings of the 2017 Conference on Empirical Methods in Natural Language Processing, pp. 1730-1740, Sep. 7-11, 2017.

Katiyar et al., Going out on a limb: Joint extraction of entity mentions and relations without dependency trees, Proceedings of the 55th Annual Meeting of the Association for Computational Linguistics, vol. 1: Long Papers, pp. 917-928, Jul. 30-Aug. 4, 2017.

Adel et al., Global Normalization of Convolutional Neural Networks for Joint Entity and Relation Classification, Proceedings of the 2017 Conference on Empirical Methods in Natural Language Processing, pp. 1723-1729, Aug. 7, 2018.

Luan et al., Multi-Task Identification of Entities, Relations, and Coreference for Scientific Knowledge Graph Construction, Proceedings of the 2018 Conference on Empirical Methods in Natural Language Processing, pp. 3219-3232, Aug. 29, 2018.

Luan et al., A general framework for information extraction using dynamic span graphs, Proceedings of the 2019 Conference of the North American Chapter of the Association for Computational Linguistics: Human Language Technologies, vol. 1 Long and Short Papers, pp. 3036-3046, Apr. 5, 2019.

Fu et al., GraphRel: Modeling text as relational graphs for joint entity and relation extraction, Proceedings of the 57th Annual Meeting of the Association for Computational Linguistics, pp. 1409-1418, Jul. 28-Aug. 2, 2019.

Ramshaw et al., Text chunking using transformation-based learning, May 23, 1995.

Kübler et al., Dependency parsing, Synthesis lectures on human language technologies, Jan. 2009.

Kipf et al., Semi-supervised classification with graph convolutional networks, Feb. 22, 2017.

Guo et al., Deep graph translation, Jun. 22, 2018.

* cited by examiner

AUTOMATED GRAPH BASED INFORMATION EXTRACTION

BACKGROUND

The present invention relates generally to a method, system, and computer program product for information extraction from natural language text. More particularly, the present invention relates to a method, system, and computer program product for automated graph based information extraction.

Information extraction is the extraction of structured data from unstructured natural language text or semi-structured documents. Structured data is semantically well-defined data from a chosen target knowledge domain, interpreted with respect to category and context. The results of information extraction are used in many applications that process natural language, such as filling in template documents with specific information, natural-language based information retrieval, question answering, automated translation from one natural language to another, and knowledge base supplementation.

Entity recognition, relation extraction, and coreference resolution are common information extraction tasks. Entity recognition is the recognition of nouns (entities) such as known names (e.g. for people, organizations, and objects), place names, temporal expressions, and certain types of numerical expressions. For example, the sentence "Tom's car broke down as he arrived at LunchSpot to meet Mike" includes entities such as "Tom" (a person), "car" (a vehicle), "he" (a person), "LunchSpot" (a location as well as an organization), and "Mike" (a person). Relation extraction is the extraction of relationships between entities. For example, the phrase "Tom's car" denotes a relation between Tom and the car. Similarly, Tom and Mike are meeting at LunchSpot, denoting relations between Tom and Mike, between Tom and LunchSpot, and between Mike and LunchSpot. Coreference resolution is the identification of coreferences, text expressions that refer to an equivalent entity. For example, in the example sentence "he" and "Tom" are coreferences.

A graph models pairwise relations between objects. A graph comprises nodes (also called vertices or points) which are connected by edges (also called links or lines). Thus, in a word-level graph each node represents a word in a natural language sentence and each edge represents a relationship between words in the sentence. For example, in a word-level graph modelling the sentence "'This thing's useless!' Tom exclaimed as it gave off smoke", "This" and "thing" might be nodes connected by an edge denoting that "This" is an adjective modifying "thing". Similarly, in a sentence-level graph each node represents a sentence in a natural language document (or other collection of sentences) and each edge represents a relationship between sentences in the document. For example, if the two example sentences above were adjacent to each other in a document, in a sentence-level graph of the document the sentences might each be nodes connected by an edge denoting that the two sentences are adjacent to each other.

The illustrative embodiments recognize that presently available pipeline based information extraction systems perform information extraction tasks separately, for example implementing entity recognition, relation extraction, and coreference resolution in separate modules and using output of the entity recognition as input to the relation extraction and coreference resolution. However, pipeline-based systems are subject to cascading errors, because an error in the output of one module can be compounded by processing in another module. In addition, because each task is implemented separately, knowledge of the output of one module—for example, coreference resolution—is unavailable to assist with another task such as relation extraction.

The illustrative embodiments also recognize that presently available joint information extraction systems simultaneously identify entities and relations. Joint systems tend to perform better than pipeline systems, because the output of one module—for example, extracted entities—is available to assist with another task such as relation extraction. However, joint systems do not perform coreference resolution, and mostly rely on word-level information rather than higher levels of information typically found in natural language documents.

The illustrative embodiments also recognize that graph neural network based end-to-end systems are also presently available for use in information extraction. Graph neural network systems use word-level graphs of natural language text to perform entity recognition and relation extraction. However, existing graph-based systems rarely consider interactions between sentences when performing relation extraction.

Consequently, the illustrative embodiments recognize that there is an unmet need for an information extraction system that performs entity recognition, relation extraction, and coreference resolution in an integrated end-to-end system, in which intermediate entity extraction results improve intermediate relation and coreference results and vice versa.

SUMMARY

The illustrative embodiments provide a method, system, and computer program product. An embodiment includes a method that parses a set of sentences within a natural language text document, the parsing generating a word-level graph corresponding to a sentence in the set of sentences, the word-level graph modelling relationships between words within the sentence, a word-level node within the word-level graph corresponding to a word within the sentence. An embodiment identifies, within the word-level graph using a trained entity identification model, a set of entity candidates, an entity candidate in the set of entity candidates comprising at least one word-level node. An embodiment generates, from a set of graphs modelling relationships between portions of the set of sentences, a set of embeddings, an embedding in the set of embeddings comprising a multidimensional numerical representation of an element of a graph in the set of graphs. An embodiment extracts, from a set of pairs of embeddings in the set of embeddings using a set of deconvolution layers, a set of links between entity candidates within the set of entity candidates. An embodiment generates, from the set of links and the set of entity candidates, an output graph modelling linkages between portions of the set of sentences within the natural language text document. Thus, an embodiment provides automated graph based information extraction from the natural language text document.

In another embodiment, the trained entity identification model comprises a bidirectional long short-term memory and a graph convolution network trained to identify entity candidates. Thus, the embodiment provides a particular configuration of the trained entity identification model.

Another embodiment tags, according to membership in the entity candidate, a plurality of word-level nodes within the word-level graph. Thus, the embodiment further tags a portion of an entity candidate.

In another embodiment, the set of graphs comprises a sentence-level graph modelling relationships between sentences in the set of sentences, an entity-level graph modelling relationships between a set of entity candidates including the entity candidate, and an interaction graph modelling relationships between the sentence-level graph and the entity-level graph. Thus, the embodiment constructs a sentence-level graph, an entity-level graph, and an interaction graph for use in automated graph based information extraction.

In another embodiment, the set of deconvolution layers comprises a relation edge deconvolution path and a coreference link deconvolution path, an output of a first deconvolution layer in the relation edge deconvolution path applied to an input of a second deconvolution layer in the relation edge deconvolution path and an input of a second deconvolution layer in the coreference link deconvolution path, an output of a first deconvolution layer in the coreference link deconvolution path applied to the input of the second deconvolution layer in the relation edge deconvolution path and the input of the second deconvolution layer in the coreference link deconvolution path. Thus, the embodiment provides further detail of the set of deconvolution layers.

In another embodiment, a link in the set of links between entities within the set of entity candidates comprises a coreference link. Thus, the embodiment generates a coreference link from the set of sentences within the natural language text document.

In another embodiment, a link in the set of links between entities within the set of entity candidates comprises a relation link. Thus, the embodiment generates a relation link from the set of sentences within the natural language text document.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
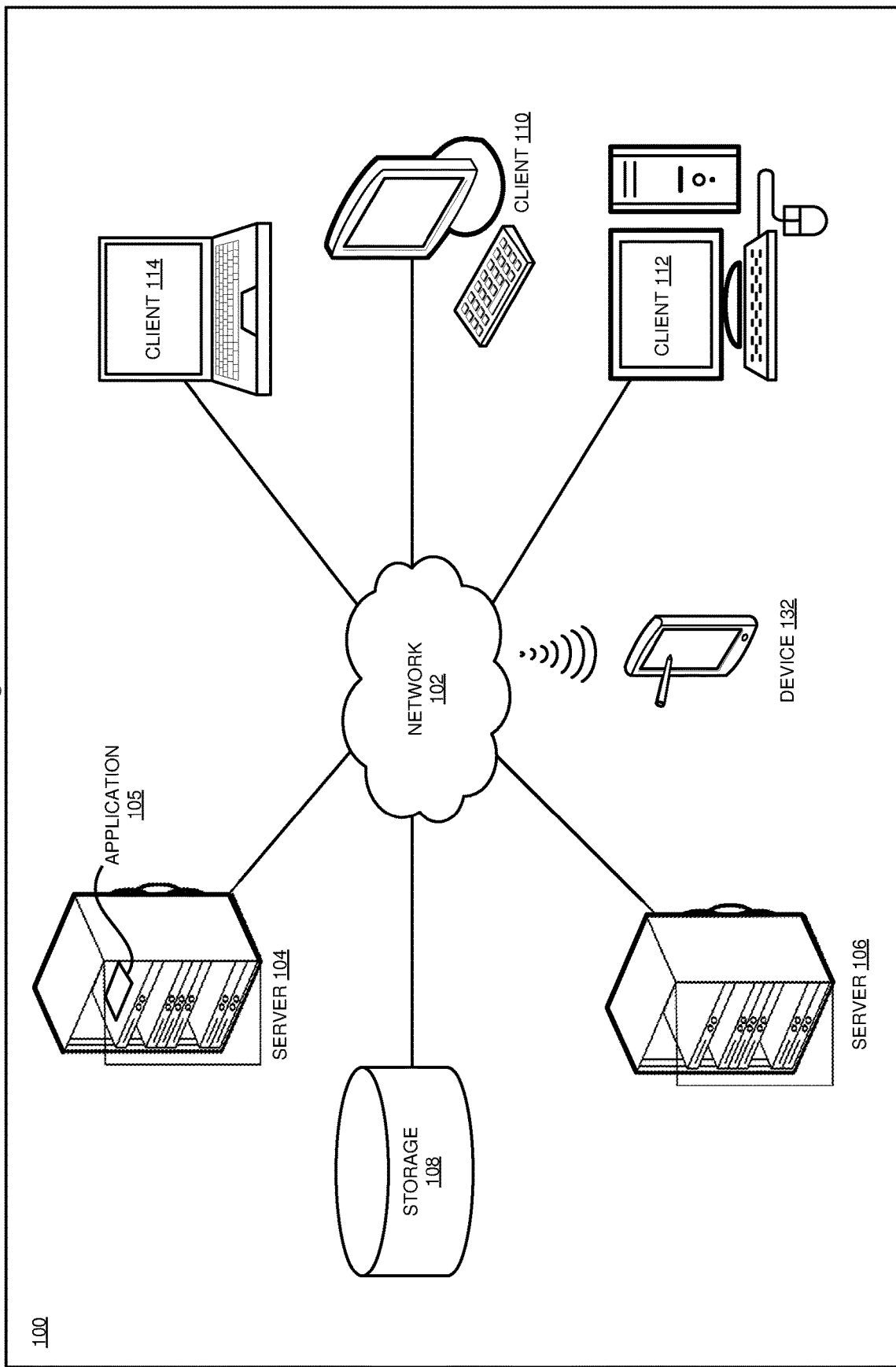
FIG. 1 depicts a block diagram of a network of data processing systems in which illustrative embodiments may be implemented.

The illustrative embodiments recognize that there is an unmet need for an information extraction system that performs entity recognition, relation extraction, and coreference resolution in an integrated end-to-end system, in which intermediate entity extraction results improve intermediate relation and coreference results and vice versa.

The illustrative embodiments recognize that the presently available tools or solutions do not address these needs or provide adequate solutions for these needs. The illustrative embodiments used to describe the invention generally address and solve the above-described problems and other problems related to automated graph based information extraction.

An embodiment can be implemented as a software application. The application implementing an embodiment can be configured as a modification of an existing natural language document processing system, as a separate application that operates in conjunction with an existing natural language document processing system, a standalone application, or some combination thereof.

Particularly, some illustrative embodiments provide a method that identifies a set of entity candidates within a word-level graph of a sentence in a natural language text document, generates embeddings from a set of graphs modelling relationships between portions of the document, extracts a set of links between entity candidates from pairs of the embeddings, and uses the sets of entity candidates and links to generate an output graph modelling linkages between portions of the document.

An embodiment receives a natural language text document from which structured information is to be extracted. The document includes a set of sentences, each including one or more words. As used herein, a sentence is a portion of natural language text, and need not be a grammatically correct sentence or be separated from another sentence by any specific punctuation. An embodiment uses any presently available technique to parse the set of sentences, generating a set of word-level graphs, each graph corresponding to a sentence in the document.

An embodiment uses a trained entity identification model to identify one or more entity candidates within the word-level graphs of the document. An entity candidate comprises at least one node within a word-level graph. An embodiment generates a vector representation of each node, or word, within a word-level graph, using a presently-available technique. A vector representation, also called an embedding, is a multidimensional numerical representation of a portion of data. Thus, a word embedding is a multidimensional numerical representation of a natural language word, and a sentence embedding is a multidimensional numerical representation of natural language. In embodiments, the trained entity identification model includes a word embedding model followed by a graph convolutional network (GCN). The word embedding model takes, as input, an initial vector representation of a natural language word generated by a presently-available technique, such as word2vector, Glove, and the like, and outputs another embedding. In embodiments, the word embedding model is implemented using a recurrent neural network, a long short-term memory (LSTM, a recurrent neural network with feedforward connections), a bidirectional LSTM (BiLSTM, a sequence processing model that consists of two LSTMs, one including feedforward connections and one including feedback connections), or another type of a neural network. A GCN is a convolutional neural network that takes, as input, embeddings and a representation of a graph, and learns to identify a feature of the graph. The model, after training on a set of labelled training data, classifies words within a sentence into one of three categories: the first word of an entity, a subsequent portion of an entity, and a word that is not part of an entity. An embodiment combines words classified as portions of an entity into an entity candidate. For example, for an input sentence "'This thing's useless!' Tom exclaimed as it gave off smoke", "This", "Tom", and "smoke" might be classified as the first word of an entity, "thing" might be classified as a subsequent portion of an entity, and the remaining words in the sentence might be classified as non-entity words. The embodiment assembles the classified words into entity candidates "This thing", "Tom", and "smoke".

An embodiment constructs an entity-level graph. In the entity-level graph, each node represents an identified entity candidate within a sentence, and each edge represents a relationship between entity candidates within the sentence. To determine relationships between entity candidates, an embodiment uses a word-level graph of a sentence. For example, because the phrase "Tom's car" denotes a relation between Tom and the car, an entity-level graph for a sentence including the phrase might have a node representing "Tom" and a node representing "car", connected by an edge denoting the relationship between them.

An embodiment constructs a sentence-level graph. In the sentence-level graph, each node represents a sentence in a natural language document (or other collection of sentences). Graph edges link nodes representing sentences that are adjacent to each other in the document.

Processing sentences individually does not preserve inferences between sentences. For example, "this thing" refers to something likely mentioned in a previous sentence. Thus, to incorporate relationships between sentences within a document, an embodiment also constructs an interaction graph. In the interaction graph, each edge represents a relationship between a node in the entity-level graph and a node in the sentence-level graph. Thus, for example, for a sentence including two different entity candidates, the interaction graph would have edges connecting a node in the sentence-level graph, representing the sentence, with two nodes, each representing an entity candidate, in the entity-level graph. Similarly, for an entity candidate included in two different sentences, the interaction graph would have edges connecting a node in the entity-level graph with nodes in the sentence-level graph representing each sentence.

An embodiment generates, from the entity-level, sentence-level, and interaction graphs, a set of embeddings, each embedding representing a multidimensional numerical representation of a node in one of the graphs. One embodiment generates embeddings by applying representations of the entity-level and sentence-level graphs to a sentence GCN and an entity GCN, then inputting the results to an interaction GCN which generates interaction embeddings. The interaction embeddings are then applied to the sentence GCN and entity GCNs, and the process repeated at least once.

An embodiment, optionally, removes one or more embeddings from the set of embeddings. One embodiment uses a filter or mask to remove any embeddings matching a criterion or failing to match a criterion. Removing some embeddings conserves computation resource by omitting further processing for embeddings that might no longer be of interest. An embodiment also discards sentence embeddings from the set of embeddings.

An embodiment combines pairs of embeddings within the (optionally masked) set of embeddings. One embodiment pairs each embedding with each other embedding. To pair embeddings, one embodiment concatenates the two embeddings together. Pairs of embeddings represent items that could have a relationship with each other (e.g. an entity candidate with another entity candidate).

An embodiment extracts a set of links between the set of paired embeddings. To extract the set of links, one embodiment uses an edge deconvolution technique, which generates edges representing relation and coreference links between nodes representing entities. To perform the edge deconvolution, an embodiment uses two parallel sets of deconvolution layers. One set of deconvolution layers determines whether there is a coreference link between an input pair of entity embeddings, and the other set of deconvolution layers classifies the type of relation between the same input pair of embeddings. The input to each deconvolution layer in the set is outputs from the previous relation and coreference deconvolution layers, concatenated together.

An embodiment uses the set of entity candidates and the set of links denoting coreferences and relations between the entity candidates to generate an output graph modelling linkages between portions of the input document. The output graph represents the input document in a structured form, improving ease of use of the information in the document in other information processing applications.

An embodiment trains the embedding generation and deconvolution models together, using a set of natural language documents with already-labelled entities, coreferences, and relations.

The manner of automated graph based information extraction described herein is unavailable in the presently available methods in the technological field of endeavor pertaining to natural language document processing. A method of an embodiment described herein, when implemented to execute on a device or data processing system, comprises substantial advancement of the functionality of that device or data processing system in identifying a set of entity candidates within a word-level graph of a sentence in a natural language text document, generating embeddings from a set of graphs modelling relationships between portions of the document, extracting a set of links between entity candidates from pairs of the embeddings, and using the sets of entity candidates and links to generate an output graph modelling linkages between portions of the document.

The illustrative embodiments are described with respect to certain types of documents, sentences, words, entities, relations, coreferences, graphs, neural networks, convolutions, deconvolutions, embeddings, models, trainings, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
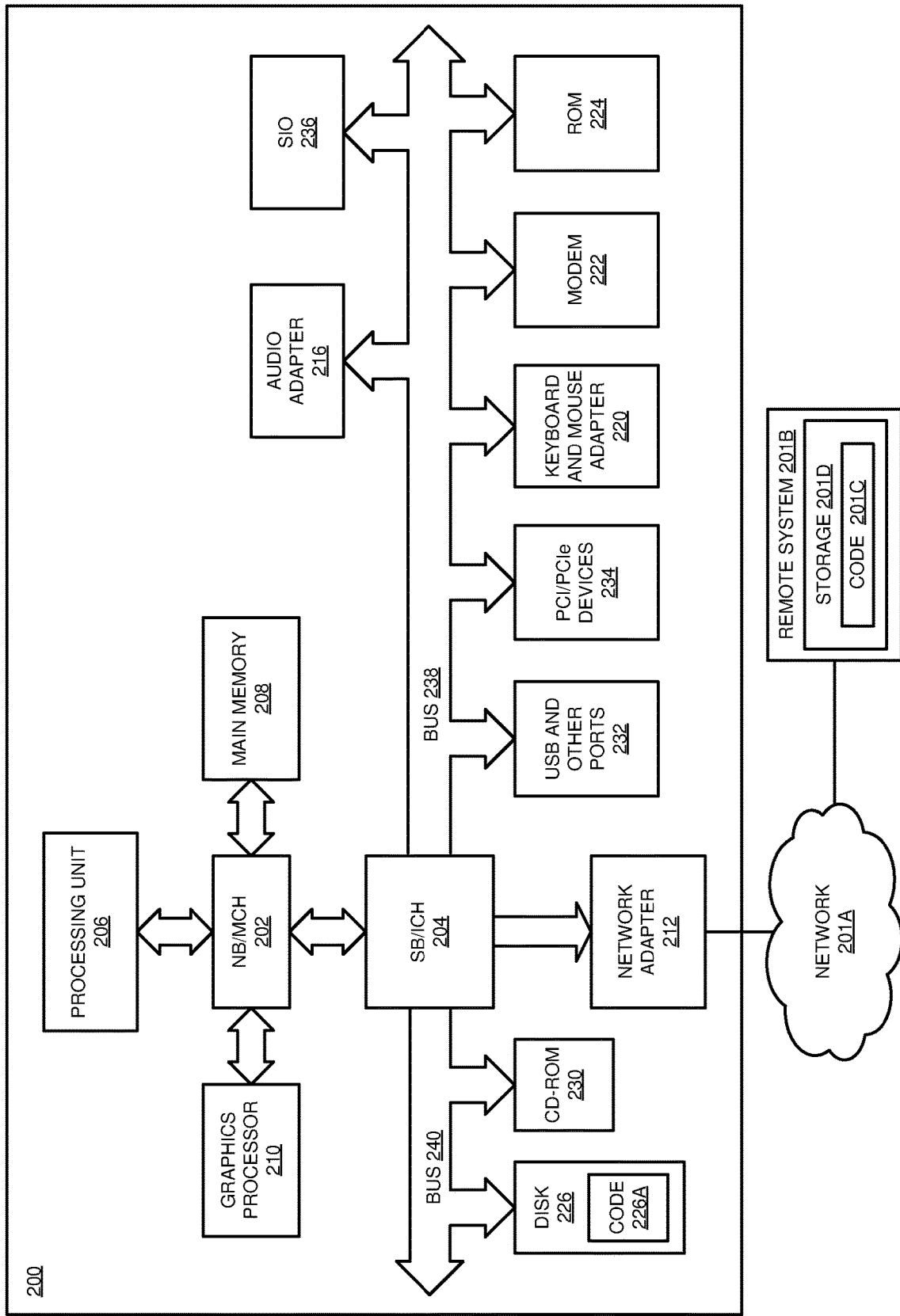
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
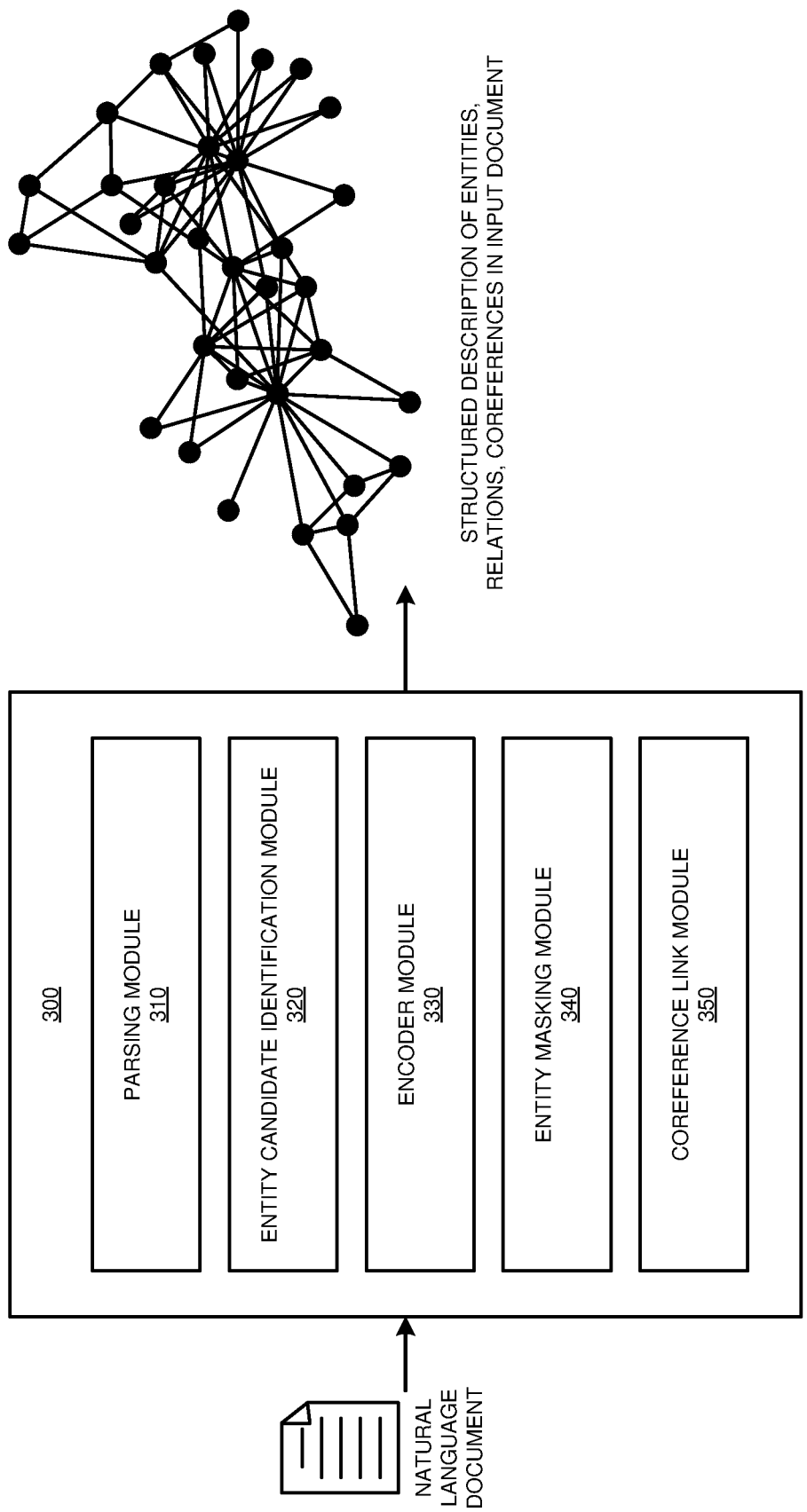
FIG. 3 depicts a block diagram of an example configuration for automated graph based information extraction in accordance with an illustrative embodiment.

With reference to FIG. 3, this figure depicts a block diagram of an example configuration for automated graph based information extraction in accordance with an illustrative embodiment. Application 300 is an example of application 105 in FIG. 1 and executes in any of servers 104 and 106, clients 110, 112, and 114, and device 132 in FIG. 1.

Parsing module 310 receives a natural language text document from which structured information is to be extracted. The document includes a set of sentences, each including one or more words. Module 310 uses any presently available technique to parse the set of sentences, generating a set of word-level graphs, each graph corresponding to a sentence in the document.

Entity candidate identification module 320 uses a trained entity identification model to identify one or more entity candidates within the word-level graphs of the document. Module 320 generates a vector representation of each node, or word, within a word-level graph, using a presently-available technique. In implementations of module 320, the trained entity identification model includes a word embedding model followed by a GCN. The word embedding model takes, as input, an initial vector representation of a natural language word generated by a presently-available technique, such as word2vector, Glove, and the like, and outputs another embedding. In implementations of module 320, the word embedding model is implemented using a recurrent neural network, an LSTM, a BiLSTM, or another type of a neural network. The model, after training on a set of labelled training data, classifies words within a sentence into one of three categories: the first word of an entity, a subsequent portion of an entity, and a word that is not part of an entity. Module 320 combines words classified as portions of an entity into an entity candidate.

Encoder module 330 uses a word-level graph of a sentence to construct an entity-level graph, in which each node represents an identified entity candidate within a sentence and each edge represents a relationship between entity candidates within the sentence. Module 330 constructs a sentence-level graph, in which each node represents a sentence in a natural language document, and graph edges link nodes representing sentences that are adjacent to each other in the document. As well, to incorporate relationships between sentences within a document, module 330 also constructs an interaction graph, in which each edge represents a relationship between a node in the entity-level graph and a node in the sentence-level graph.

Module 330 generates, from the entity-level, sentence-level, and interaction graphs, a set of embeddings, each representing a multidimensional numerical representation of a node in one of the graphs. One implementation of module 330 generates embeddings by applying representations of the entity-level and sentence-level graphs to a sentence GCN and an entity GCN, then inputting the results to an interaction GCN which generates interaction embeddings. The interaction embeddings are then applied to the sentence GCN and entity GCNs, and the process repeated at least once.

Entity masking module 340 removes one or more embeddings from the set of embeddings. One implementation of module 340 uses a filter or mask to remove any embeddings matching a criterion or failing to match a criterion. Removing some embeddings conserves computation resource by omitting further processing for embeddings that might no longer be of interest. Module 340 also discards sentence embeddings from the set of embeddings.

Coreference link module 350 combines pairs of embeddings within the masked set of embeddings. One implementation of module 350 pairs each embedding with each other embedding by concatenating the two embeddings together. Pairs of embeddings represent items that could have a relationship with each other (e.g. an entity candidate with another entity candidate).

Module 350 extracts a set of links between the set of paired embeddings. To extract the set of links, one implementation of module 350 uses an edge deconvolution technique, which generates edges representing relation and coreference links between nodes representing entities. To perform the edge deconvolution, one implementation of module 350 uses two parallel sets of deconvolution layers. One set of deconvolution layers determines whether there is a coreference link between an input pair of entity embeddings, and the other set of deconvolution layers classifies the type of relation between the same input pair of embeddings. The input to each deconvolution layer in the set is outputs from the previous relation and coreference deconvolution layers, concatenated together.

Application 300 uses the set of entity candidates and the set of links denoting coreferences and relations between the entity candidates to generate an output graph modelling linkages between portions of the input document. The output graph represents the input document in a structured form, improving ease of use of the information in the document in other information processing applications. Application 300 trains the embedding generation and deconvolution models together, using a set of natural language documents with already-labelled entities, coreferences, and relations.

Figure 4:
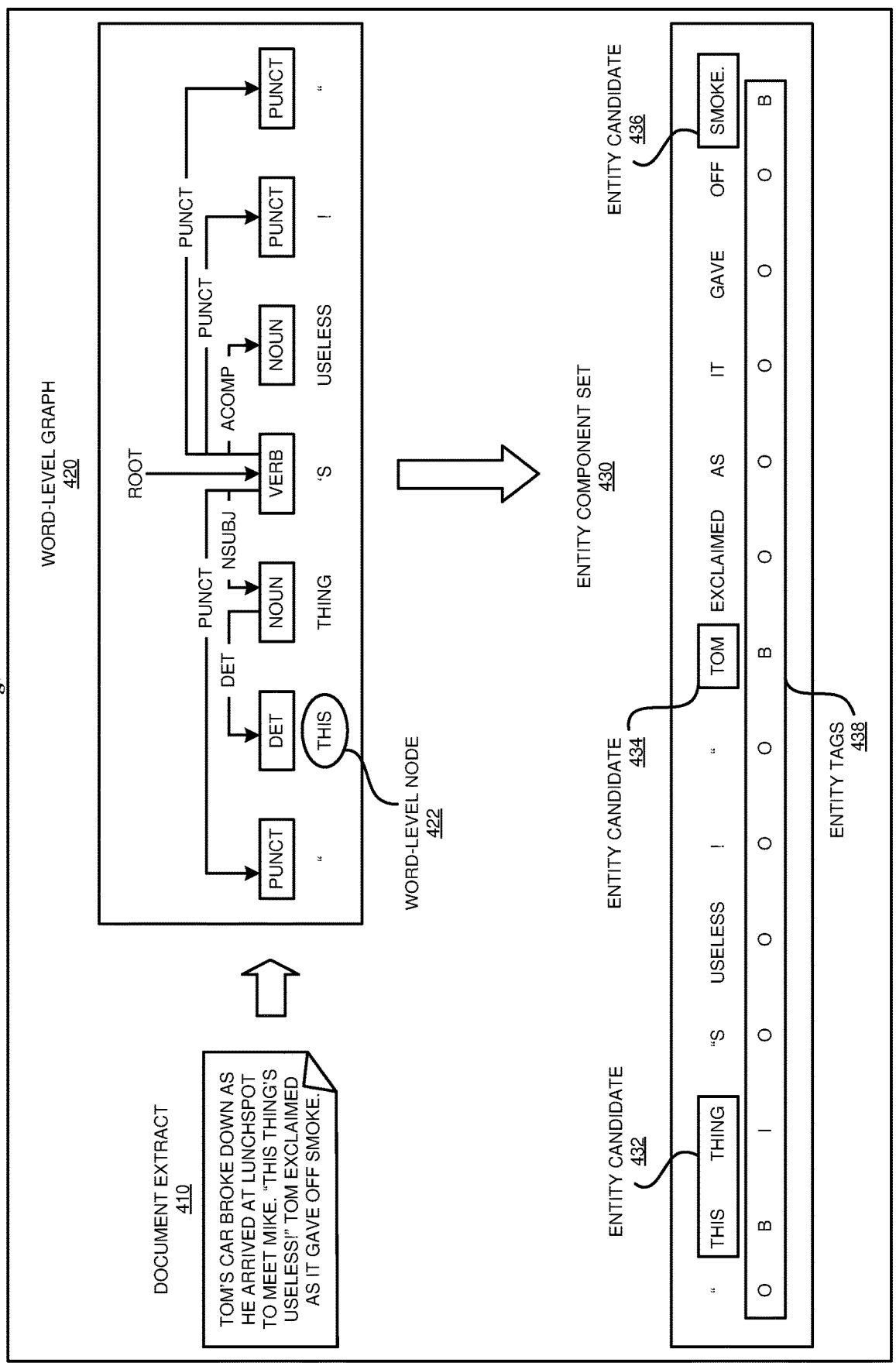
FIG. 4 depicts an example of automated graph based information extraction in accordance with an illustrative embodiment.

With reference to FIG. 4, this figure depicts an example of automated graph based information extraction in accordance with an illustrative embodiment. The example can be executed using application 300 in FIG. 3.

Word-level graph 420 depicts a portion of a word-level graph generated from document extract 410. Graph 420 includes nodes such as word-level node 422. Each node represents a word in a natural language sentence within document extract 410, and each edge represents a relationship between words in the sentence. For example, "This" and "thing" are nodes connected by an edge labelled "DET", denoting that "This" is a determinative adjective modifying "thing".

Application 300 uses a trained entity identification model to identify entity candidates 432, 434, and 436 from word-level graphs generated from document extract 410. The model, after training on a set of labelled training data, classifies words within a sentence into one of three categories: the first word of an entity (labelled B), a subsequent portion of an entity (labelled I), and a word that is not part of an entity (labelled O). Entity tags 438 depict tags corresponding to words within entity component set 430. An embodiment combines words classified as portions of an entity into an entity candidate—for example, entity candidate 432.

Figure 5:
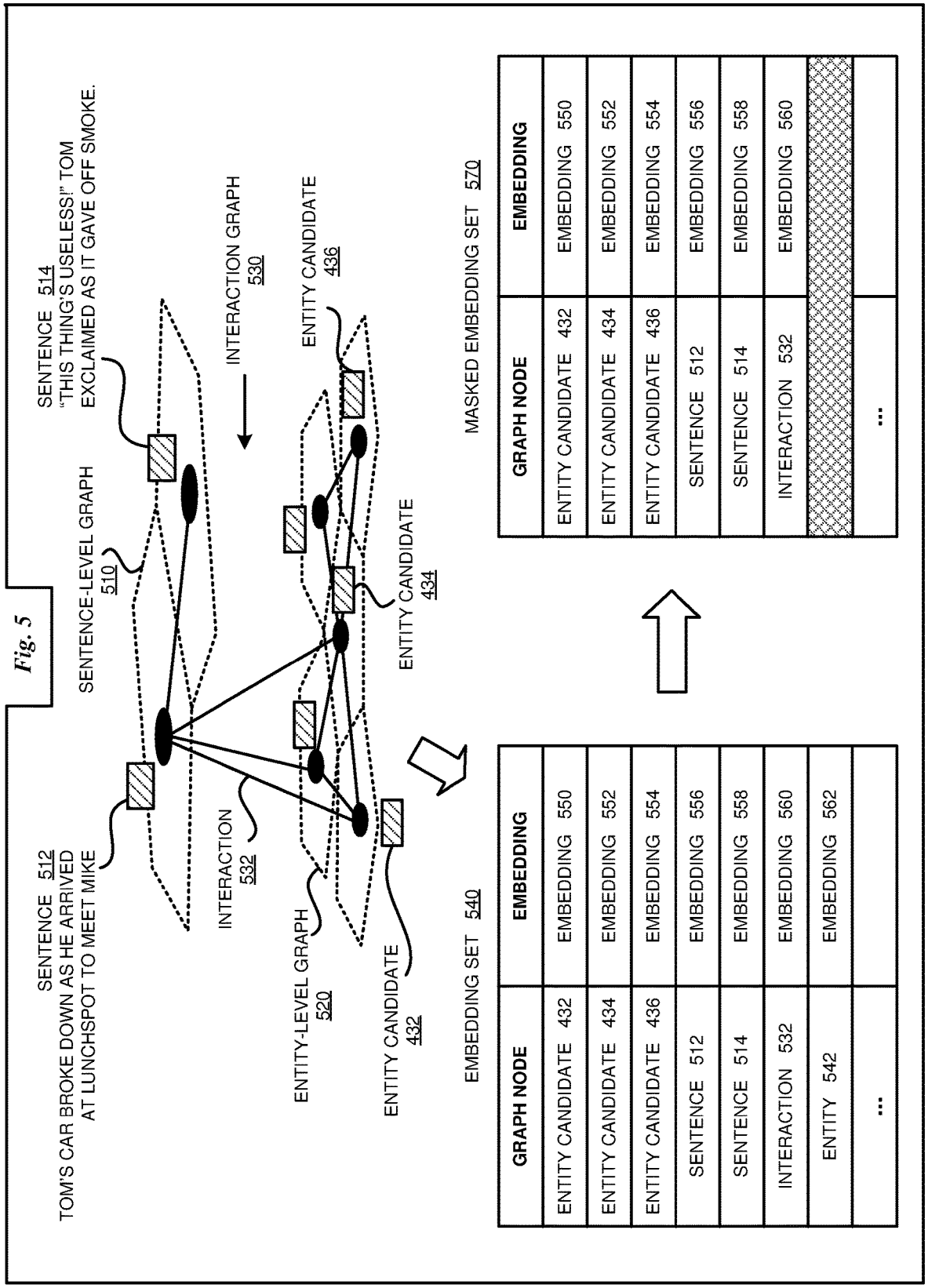
FIG. 5 depicts a continued example of automated graph based information extraction in accordance with an illustrative embodiment.

With reference to FIG. 5, this figure depicts a continued example of automated graph based information extraction in accordance with an illustrative embodiment. Entity candidates 432, 434, and 436 are the same as entity candidates 432, 434, and 436 in FIG. 4.

As depicted, application 300 has constructed an entity-level graph 520, in which each node (e.g. entity candidates 432, 434, and 436) represents an identified entity candidate, and each edge represents a relationship between entity candidates. Application has also constructed sentence-level graph 510, in which each node (e.g. sentences 512 and 514) represents a sentence in a natural language document and graph edges link nodes representing sentences that are adjacent to each other in the document. Application 300 has also constructed interaction graph 530, in which each edge (e.g. interaction 532) represents a relationship between a node in graph 520 (e.g. entity candidate 432) and a node in graph 510 (e.g. sentence 512).

Application 300 generates, from graphs 510, 520, and 530, embedding set 540, each embedding (e.g. embeddings 550, 552, 554, 556, 558, 560, and 562) representing a multidimensional numerical representation of a node in one of the graphs. Application 300 removes embedding 562, corresponding to entity 542, from embedding set 540, generating masked embedding set 570.

Figure 6:
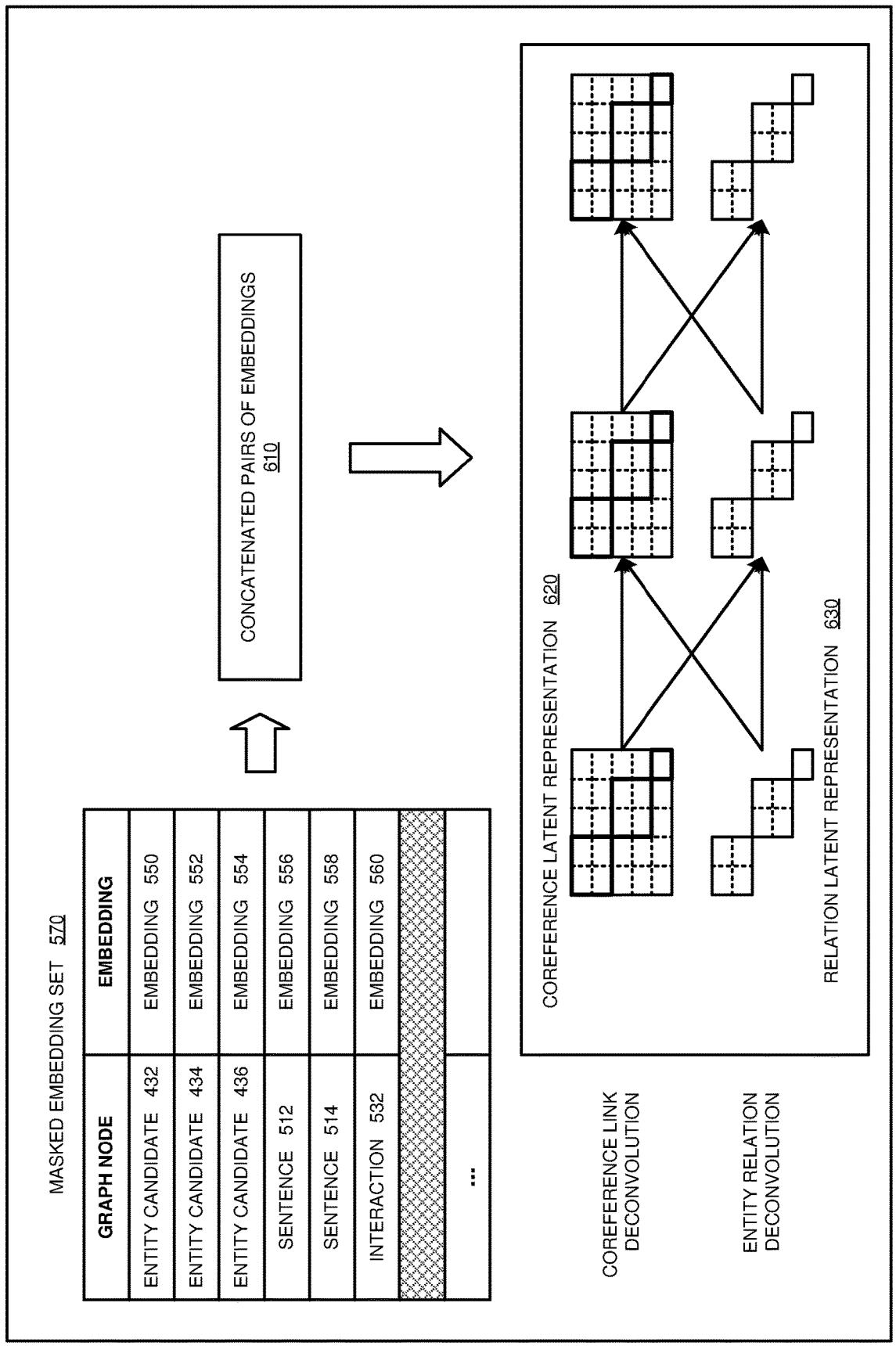
FIG. 6 depicts a continued example of automated graph based information extraction in accordance with an illustrative embodiment.

With reference to FIG. 6, this figure depicts a continued example of automated graph based information extraction in accordance with an illustrative embodiment. Masked embedding set 570 is the same as masked embedding set 570 in FIG. 5.

Application 300 combines pairs of embeddings within masked embedding set 570, by concatenating two embeddings from masked embedding set 570 together. The result is concatenated pairs of embeddings 610.

Application 300 extracts a set of links between embeddings 610. To extract the set of links, application 300 uses two parallel sets of deconvolution layers. One set of deconvolution layers (depicted as coreference latent representation 620) classifies a type of coreference between an input pair of embeddings, and the other set of deconvolution layers (depicted as relation latent representation 630) classifies a type of relation between the same input pair of embeddings. The input to each deconvolution layer in the set is outputs from the previous relation and coreference deconvolution layers, concatenated together.

Figure 7:
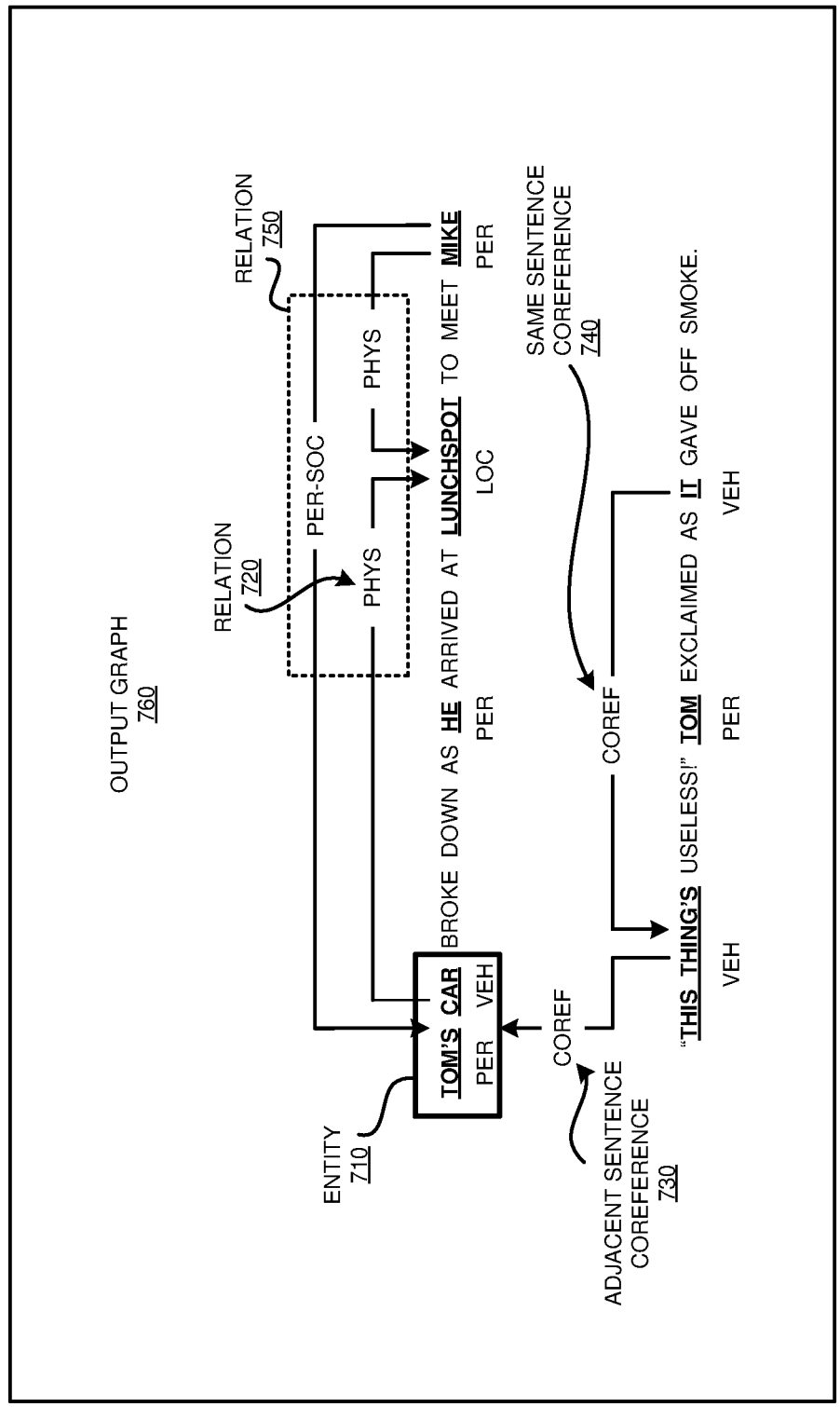
FIG. 7 depicts a continued example of automated graph based information extraction in accordance with an illustrative embodiment.

With reference to FIG. 7, this figure depicts a continued example of automated graph based information extraction in accordance with an illustrative embodiment.

FIG. 7 depicts output graph 760, modelling linkages between portions of document extract 410 in FIG. 4. Graph 760 includes nodes such as entity 710. Relation 720 denotes a physical relation between entity 710 (Tom's car) and LunchSpot. Relation 750 denotes a personal-social relation between Tom and Mike. Adjacent sentence coreference 730 denotes a coreference between "Tom's car", in the first sentence, and "This thing", in the second sentence, because both refer to the same car. Same sentence coreference 740 denotes a coreference between "This thing" and "it" because both refer to the same car.

Figure 8:
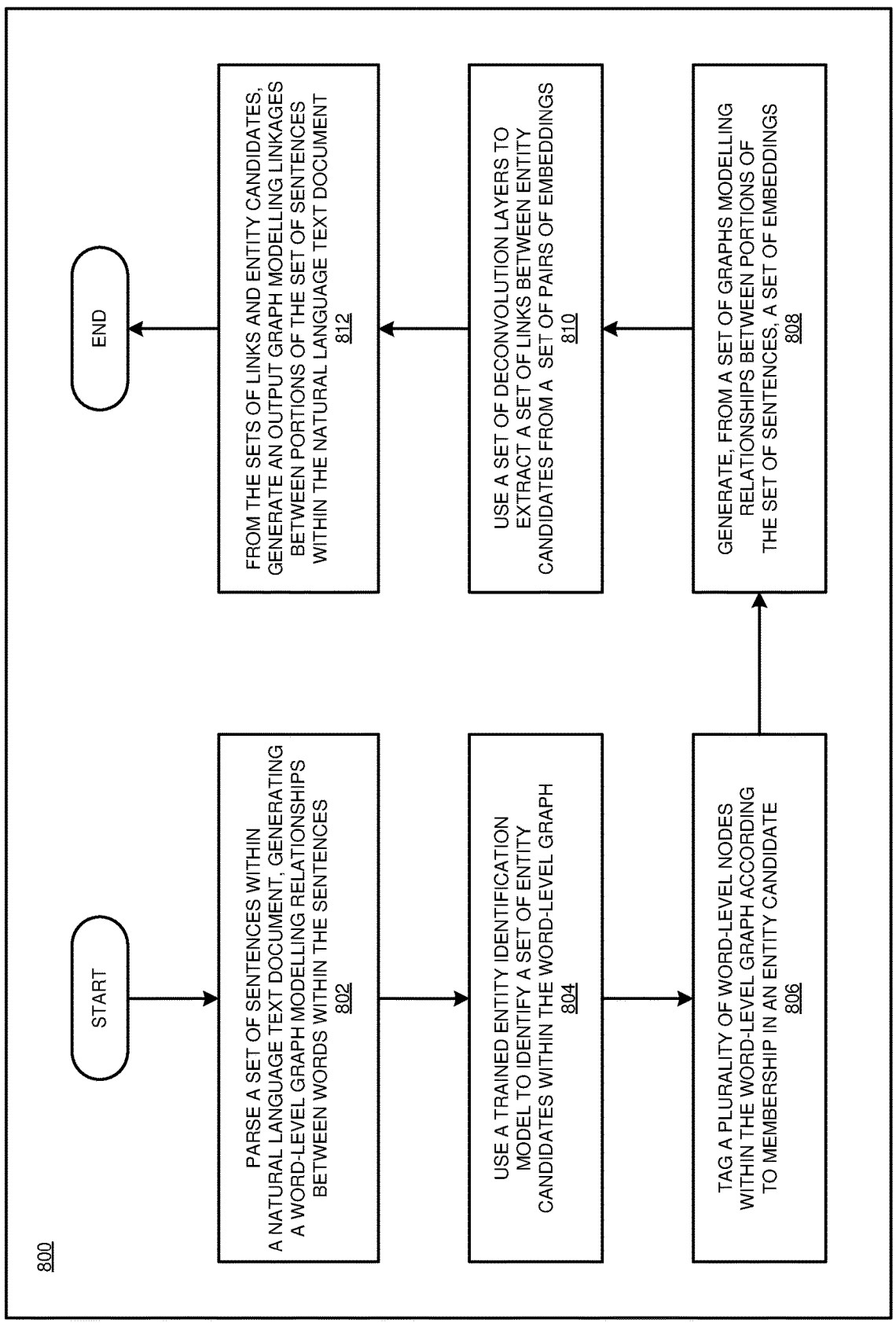
FIG. 8 depicts a flowchart of an example process for automated graph based information extraction in accordance with an illustrative embodiment.

With reference to FIG. 8, this figure depicts a flowchart of an example process for automated graph based information extraction in accordance with an illustrative embodiment. Process 800 can be implemented in application 300 in FIG. 3.

In block 802, the application parses a set of sentences within a natural language text document, generating a word-level graph modelling relationships between words within the sentences. In block 804, the application uses a trained entity identification model to identify a set of entity candidates within the word-level graph. In block 806, the application tags a plurality of word-level nodes within the word-level graph according to membership in an entity candidate. In block 808, the application generates, from a set of graphs modelling relationships between portions of the set of sentences, a set of embeddings. In block 810, the application uses a set of deconvolution layers to extract a set of links between entity candidates from a set of pairs of embeddings. In block 812, the application, from the sets of links and entity candidates, generates an output graph modelling linkages between portions of the set of sentences within the natural language text document. Then the application ends.

Figure 9:
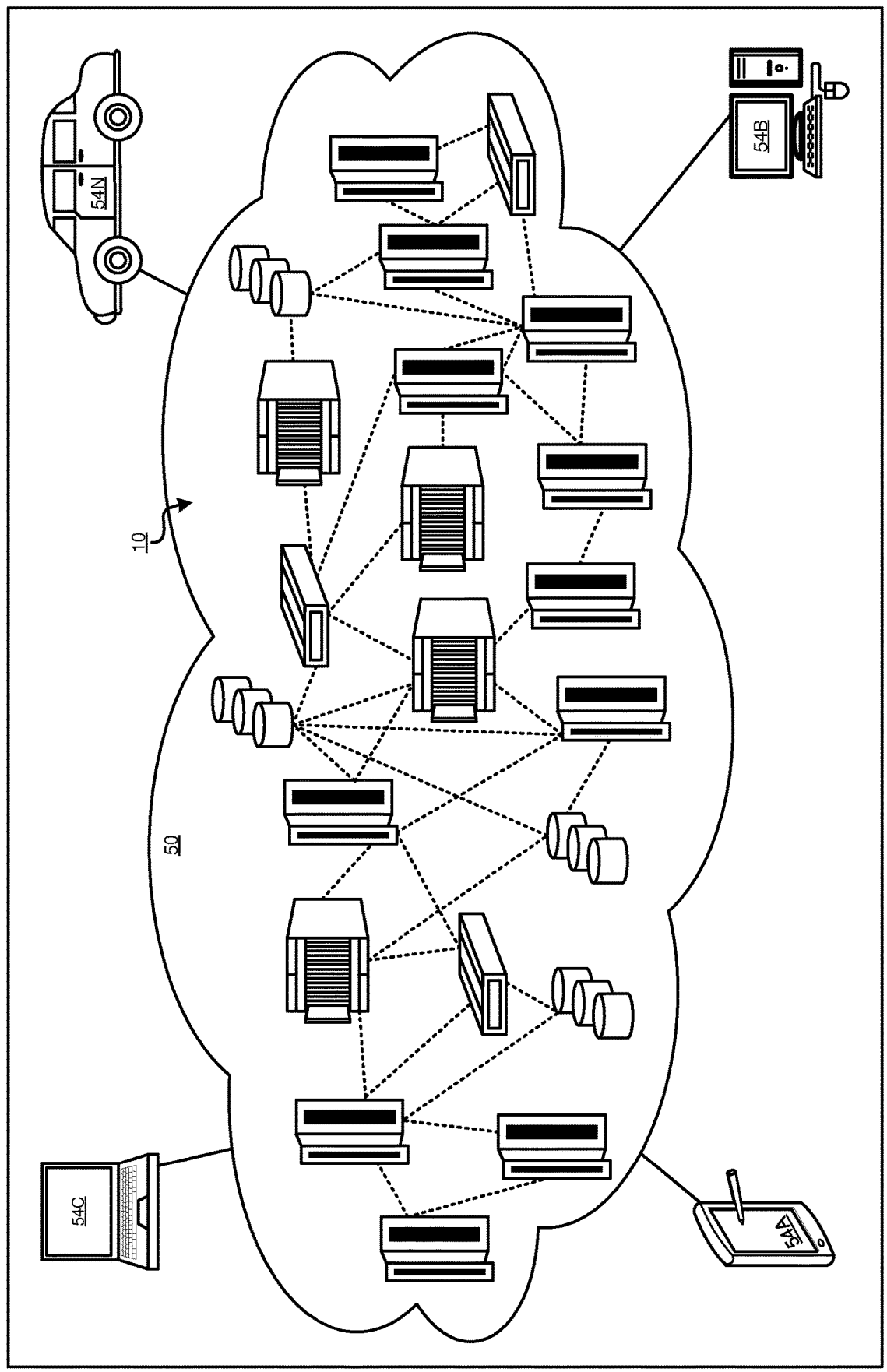
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 10:
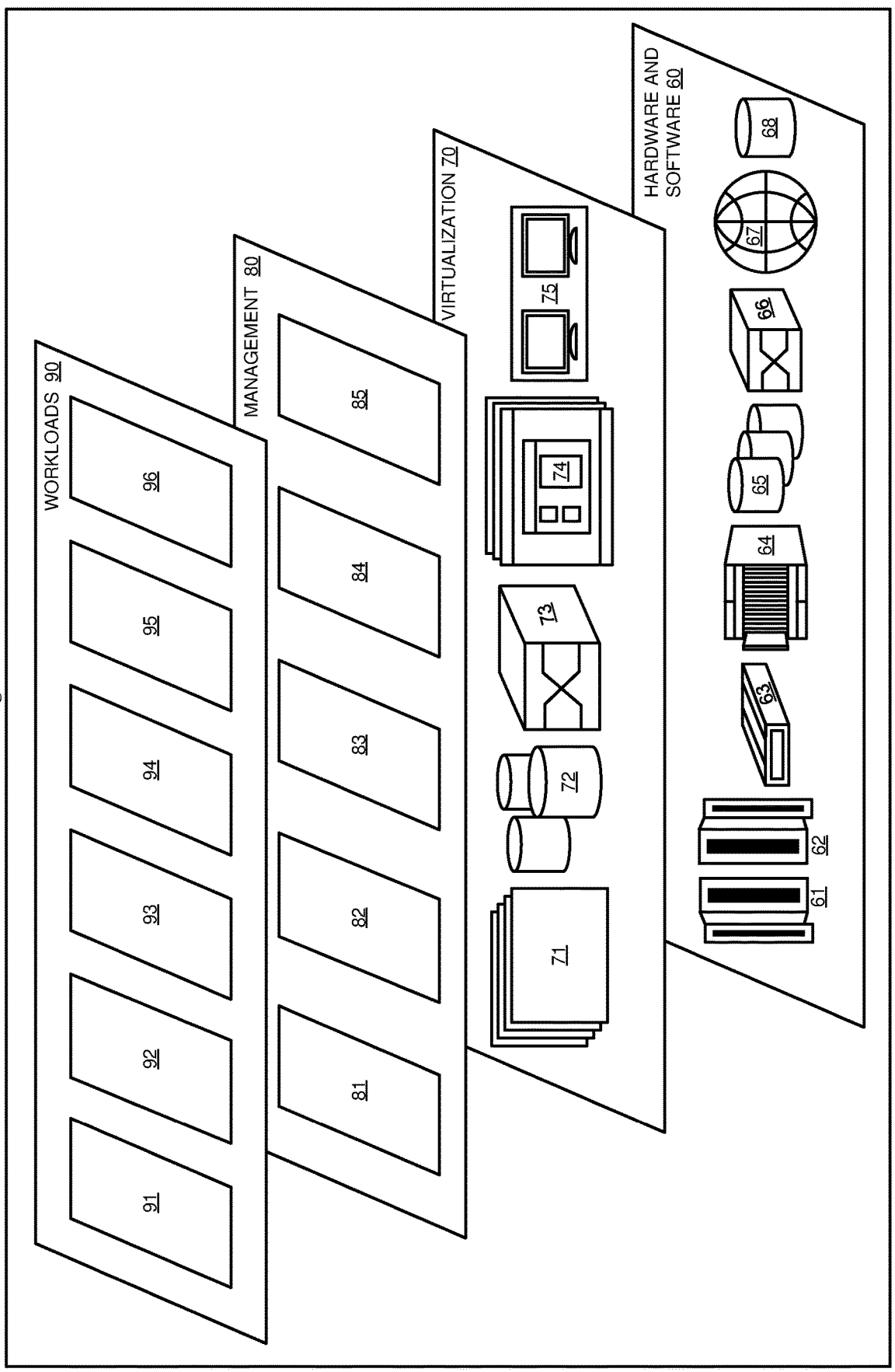
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for automated graph based information extraction and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    parsing a set of sentences within a natural language text document, the parsing generating a word-level graph corresponding to a sentence in the set of sentences, the word-level graph modelling relationships between words within the sentence, a word-level node within the word-level graph corresponding to a word within the sentence;
    identifying, within the word-level graph using a trained entity identification model, a set of entity candidates, an entity candidate in the set of entity candidates comprising at least one word-level node;
    generating, from a set of graphs modelling relationships between portions of the set of sentences, a set of embeddings, an embedding in the set of embeddings comprising a multidimensional numerical representation of an element of a graph in the set of graphs;
    extracting, from a set of pairs of embeddings in the set of embeddings using a set of deconvolution layers, a set of links between entity candidates within the set of entity candidates; and
    generating, from the set of links and the set of entity candidates, an output graph modelling linkages between portions of the set of sentences within the natural language text document.

2. The computer-implemented method of claim 1, wherein the trained entity identification model comprises a bidirectional long short-term memory and a graph convolution network trained to identify entity candidates.

3. The computer-implemented method of claim 1, further comprising:
    tagging, according to membership in the entity candidate, a plurality of word-level nodes within the word-level graph.

4. The computer-implemented method of claim 1, wherein the set of graphs comprises a sentence-level graph modelling relationships between sentences in the set of sentences, an entity-level graph modelling relationships between a set of entity candidates including the entity candidate, and an interaction graph modelling relationships between the sentence-level graph and the entity-level graph.

5. The computer-implemented method of claim 1, wherein the set of deconvolution layers comprises a relation edge deconvolution path and a coreference link deconvolution path, an output of a first deconvolution layer in the relation edge deconvolution path applied to an input of a second deconvolution layer in the relation edge deconvolution path and an input of a second deconvolution layer in the coreference link deconvolution path, an output of a first deconvolution layer in the coreference link deconvolution path applied to the input of the second deconvolution layer in the relation edge deconvolution path and the input of the second deconvolution layer in the coreference link deconvolution path.

6. The computer-implemented method of claim 1, wherein a link in the set of links between entities within the set of entity candidates comprises a coreference link.

7. The computer-implemented method of claim 1, wherein a link in the set of links between entities within the set of entity candidates comprises a relation link.

8. A computer program product for graph based information extraction, the computer program product comprising:
    one or more computer readable storage media, and program instructions collectively stored on the one or more computer readable storage media, the program instructions comprising:
        program instructions to parse a set of sentences within a natural language text document, the parsing generating a word-level graph corresponding to a sentence in the set of sentences, the word-level graph modelling relationships between words within the sentence, a word-level node within the word-level graph corresponding to a word within the sentence;
        program instructions to identify, within the word-level graph using a trained entity identification model, a set of entity candidates, an entity candidate in the set of entity candidates comprising at least one word-level node;
        program instructions to generate, from a set of graphs modelling relationships between portions of the set of sentences, a set of embeddings, an embedding in the set of embeddings comprising a multidimensional numerical representation of an element of a graph in the set of graphs;
        program instructions to extract, from a set of pairs of embeddings in the set of embeddings using a set of deconvolution layers, a set of links between entity candidates within the set of entity candidates; and
        program instructions to generate, from the set of links and the set of entity candidates, an output graph modelling linkages between portions of the set of sentences within the natural language text document.

9. The computer program product of claim 8, wherein the trained entity identification model comprises a bidirectional long short-term memory and a graph convolution network trained to identify entity candidates.

10. The computer program product of claim 8, further comprising:
    program instructions to tag, according to membership in the entity candidate, a plurality of word-level nodes within the word-level graph.

11. The computer program product of claim 8, wherein the set of graphs comprises a sentence-level graph modelling relationships between sentences in the set of sentences, an entity-level graph modelling relationships between a set of entity candidates including the entity candidate, and an interaction graph modelling relationships between the sentence-level graph and the entity-level graph.

12. The computer program product of claim 8, wherein the set of deconvolution layers comprises a relation edge deconvolution path and a coreference link deconvolution path, an output of a first deconvolution layer in the relation edge deconvolution path applied to an input of a second deconvolution layer in the relation edge deconvolution path and an input of a second deconvolution layer in the coreference link deconvolution path, an output of a first deconvolution layer in the coreference link deconvolution path applied to the input of the second deconvolution layer in the relation edge deconvolution path and the input of the second deconvolution layer in the coreference link deconvolution path.

13. The computer program product of claim 8, wherein a link in the set of links between entities within the set of entity candidates comprises a coreference link.

14. The computer program product of claim 8, wherein a link in the set of links between entities within the set of entity candidates comprises a relation link.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to parse a set of sentences within a natural language text document, the parsing generating a word-level graph corresponding to a sentence in the set of sentences, the word-level graph modelling relationships between words within the sentence, a word-level node within the word-level graph corresponding to a word within the sentence;

program instructions to identify, within the word-level graph using a trained entity identification model, a set of entity candidates, an entity candidate in the set of entity candidates comprising at least one word-level node;

program instructions to generate, from a set of graphs modelling relationships between portions of the set of sentences, a set of embeddings, an embedding in the set of embeddings comprising a multidimensional numerical representation of an element of a graph in the set of graphs;

program instructions to extract, from a set of pairs of embeddings in the set of embeddings using a set of deconvolution layers, a set of links between entity candidates within the set of entity candidates; and program instructions to generate, from the set of links and the set of entity candidates, an output graph modelling linkages between portions of the set of sentences within the natural language text document.

19. The computer system of claim 18, wherein the trained entity identification model comprises a bidirectional long short-term memory and a graph convolution network trained to identify entity candidates.

20. The computer system of claim 18, further comprising:

program instructions to tag, according to membership in the entity candidate, a plurality of word-level nodes within the word-level graph.

* * * * *